Oct. 1, 1968 J. T. KUMMER ET AL 3,404,035
SECONDARY BATTERY EMPLOYING MOLTEN ALKALI METAL REACTANT
Filed Oct. 22, 1965

INVENTORS
JOSEPH T. KUMMER
NEILL WEBER
BY J. R. Faulkner
O. B. Johnson
ATTORNEYS

3,404,035
SECONDARY BATTERY EMPLOYING MOLTEN ALKALI METAL REACTANT

Joseph T. Kummer, Ann Arbor, and Neill Weber, Dearborn, Mich., assignors to Ford Motor Company, Dearborn, Mich., a corporation of Delaware
Continuation-in-part of application Ser. No. 245,047, Dec. 17, 1962. This application Oct. 22, 1965, Ser. No. 507,624
19 Claims. (Cl. 136—6)

This application is a continuation-in-part of our copending application, Ser. No. 245,047 filed Dec. 17, 1962, now abandoned.

This invention relates to a novel secondary or rechargeable electric cell comprising a molten alkali metal anode, a cathode, a liquid electrolyte electrochemically reversibly reactive with said alkali metal and in contact with said cathode, and a cation-permeable barrier to mass liquid transfer interposed between and in contact with said anode and said liquid electrolyte.

It is one object of this invention to provide in a rechargeable cell a novel anodic half-cell unit which can be formed in any of an unlimited number of configurations thus greatly increasing flexibility in design of the total cell and making possible novel battery assemblies employing two or more of such cells in series and/or parallel electrical connection.

It is another object of this invention to provide in a rechargeable cell a novel anodic half-cell the boundaries of which have a constant configuration and a substantially constant structural strength through repeated electrochemical cycles which include both charging and discharging reactions thus eliminating electrode distortion in recharging and permitting the exhaustion of a greater percentage of the anodic reactant in the discharge half-cycle.

It is another object of this invention to provide in a rechargeable cell a novel anodic half-cell comprising molten alkali metal substantially encased in a glass container having an affinity for the selective transmission of ions of such metal therethrough.

It is still another object of this invention to provide a rechargeable cell adapted to provide a high energy release rate per unit weight, i.e. watts per pound, while providing a high capacity for energy storage per unit weight.

It is another object of this invention to provide a rechargeable cell comprising a molten alkali metal anode, a cathode, a molten, sulfur-comprising, alkali metal-reducible, electrolyte that is electrochemically reversibly reactive with said alkali metal and in contact with said cathode, and a cation-conductive barrier to mass liquid transfer interposed between and in contact with said anode and said liquid electrolyte, said barrier being characterized by low ionic resistivity with respect to cations of said alkali metal and demonstrating superior resistance to physical and/or chemical attack by molten alkali metal as evidenced by retention of ion conductivity.

The use of solid electrolytes in energy conversion devices for the generation of electrical energy is well-known in the art. See, for example, Galvanic Cells With Solid Electrolytes Involving Ionic and Electronic Conduction, C. Wagner, Department of Metallurgy, Massachusetts Institute of Technology, pp. 361–377, in International Committee of Electrochemical Thermodynamics and Kinetics, Proceedings of the Seventh Meeting at Lindau 1955, Butterworth Scientific Publications, London, England, 1957, and Solid Electrolyte Fuel Cells, J. Weissbart and R. Ruka, Fuel Cells, G. J. Young Editor, Reinhold Publishing Corporation, New York, N.Y., 1963.

The accompanying drawing schematically illustrates typical alternative embodiments in which the cell separators or solid electrolytes of this invention may be used. In the drawing.

Figure 3:
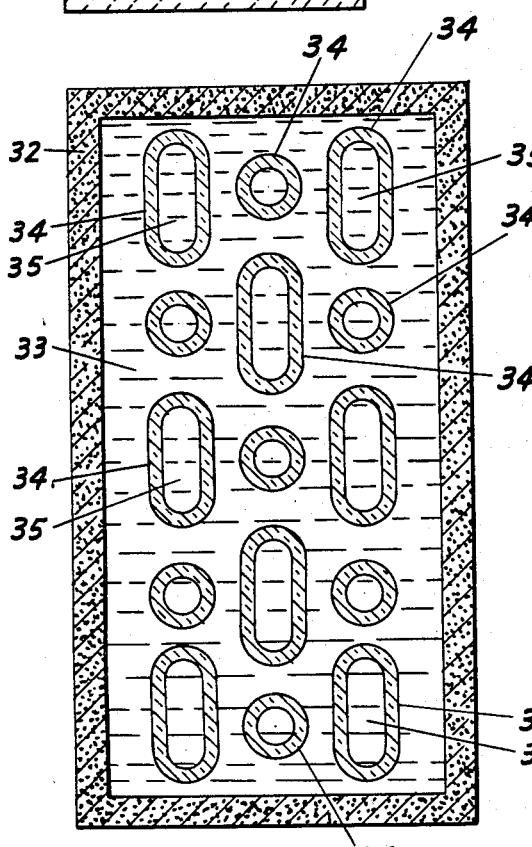
Figure 4:
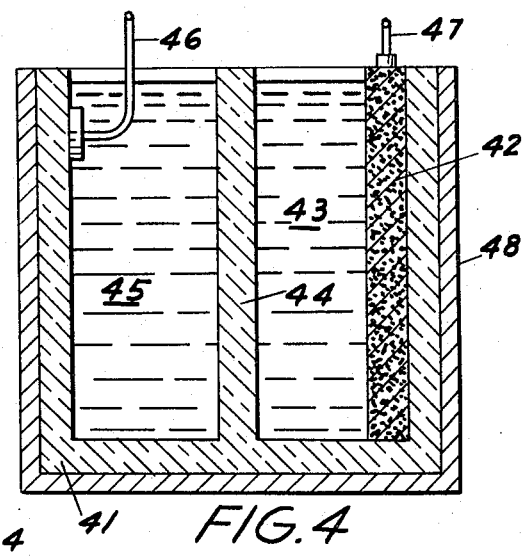

FIGURE 3 is a plan view of another embodiment of a cell in accordance with this invention illustrating the flexibility of design which may be employed in the shaping and positioning of containers for the molten anode; and FIGURE 4 is a schematic view of a cell in accordance with this invention but illustrating a different embodiment of the invention wherein the molten reactants are separated by a plate-like separator and confront each other along a single plane.

Cells employing molten metals are known to the art. See, for example, Werner et al., U.S. Patent 3,031,518. A primary cell in which the anodic reactant is enclosed by a sealed glass envelope is disclosed by Robinson in U.S. Patent 2,631,180. In the words of the patentee, the glass of the envelope is a barrier electrolyte in the above type of cell and by reason of the relatively high resistance of the glass, only small currents are delivered by the cell, even when short circuited. This primary cell is operated either as a dry cell or the cathode material may be moistened with water or a suitable aqueous solution.

In the operation of the secondary or rechargeable batteries of this invention, a high electrical output is achieved by maintaining the alkali metal anode in molten state and the molten anode is separated from the molten electrolyte with relatively thin separators having a physical and chemical composition resistive to attack by molten alkali metal and is a barrier to mass liquid transfer preferably characterized by significantly lower resistivity to ionic conductance of the alkali metal than that exhibited by ordinary soda-lime glasses or glasses for electrode acidity measuring equipment, exemplified by the glasses of Eisenman et al., U.S. Patent 2,829,090.

In accordance with this invention, the anodic reactant or reductant is an alkali metal maintained above its melting point when the cell is in operation. The anodic reactant is heated by any conventional means including, but not by way of limitation, induction heating by electrical means, indirect heat exchange with a suitable heated fluid heat exchange means, or by direct heating. The anodic reactant may also be viewed as the anode proper or conductor through which electron flow to the external circuit is achieved. A cell component of this type is conventionally referred to in the art as a sacrificial electrode in that while it is serving in the role of a conductor, it is also undergoing electrochemical reaction.

Molten sodium is employed as the anodic reactant in a preferred embodiment of the cells hereinafter used to illustrate this invention. Potassium, lithium, or other alkali metals or mixtures of alkali metals can be used if the cathodic reactant and separator, hereinafter discussed, are chosen from compatible materials.

In all embodiments of this invention, the cathodic reactant is a material that is electrochemically, reversibly reactive with the anodic reactant. The cathodic reactant or oxidant is likewise employed in a molten state and is preferably a material which will undergo all phases of the aforementioned reversible reaction with all components thereof remaining in the liquid state, i.e. without evolution of gas. The cathodic reactant is advantageously a metal salt and preferably a sulfide of the metal employed as the anodic reactant. Thus, where the anodic reactant is sodium, the cathodic reactant preferably contains sodium and sulfur. The operation of such a cell may be initiated without sodium in the cathodic reactant if the sulfur is thoroughly admixed with a suitably conductive material such as finely divided carbon particles. In a particularly preferred embodiment, the discharge cycle is initiated with a concentration of about five equivalents of sulfur to each two equivalents of sodium and the discharge operation is terminated when the atomic ratio of sodium to sulfur is about 2:3. The alkali metal concentration in the cathodic reactant controls the degree of ionic conductance therethrough. The relative concentrations of sodium and sulfur determine the melting point of the cathodic reactant. This ratio must therefore be considered in relation to the operating temperature of the cell and vice versa. If other metal salts such as metallic oxides, nitrates, etc., are used, special care must be taken either to avoid or control the evolution of gas in both the charging and discharging half-cycles.

The term "sodium and sulfur containing cathodic reactant" is not limited by any theory of ionization or combination therein and may therefore include ions, compounds, and electrically satisfied elements.

The anodic reactant is separated from the cathodic reactant by a solid barrier to mass liquid transfer that is selectively conductive with respect to cations of the anodic reactant and substantially impermeable to other ions which may be formed in the cathodic reactant. Thus, the separator is a material which will admit of the transfer of the ions of the anodic reactant through the separator and into the cathodic reactant during the discharge reaction and admit of their selective return when an electric current is passed through the cell in recharging. The cathodic reactant together with this separator provides a sufficient barrier to free electron flow in the internal portion of the electrical circuit to permit a difference of potential to develop at the respective electrodes when the cell is in operation. It is preferred that the separator be as thin as possible without unduly sacrificing structural strength. Although the optimum thickness may vary with the intended use, separators having a thickness in the range of about 20 to about 2,000, preferably 100 to 1,000, microns have been found to be effective. The transfer of anodic material is initiated when the external circuit is closed.

The cells hereinbefore and hereinafter described were first operated with a soda-alumina-silica glass in which the ratio of $Al_2O_3$ to $Na_2O$ is substantially 1:1; i.e. from about 80–100 parts $Na_2O$ to about 80–100 parts $Al_2O_3$ and wherein the mole ratio of $Na_2O$, $Al_2O_3$, and $SiO_2$ was substantially 1:1:3–6. Glasses of this type are described in detail by Eisenman et al. in U.S. Patent 2,829,090 and by Isard, J. O. in Electrical Condition in the Aluminosilicate Glasses, 43 Journal of the Society of Glass Technology, 113T (1959). While operable for this purpose, such glasses exhibit initially a conductance resistivity that is relatively high. Unfortunately, it has been found that such glasses mechanically fail under attack by molten sodium.

It was next discovered that certain other glass compositions hereinafter described in detail demonstrate a surprisingly high resistance to molten alkali metal as well as a significantly low resistivity to ionic transfer.

Separators suitable for use with cells of this invention are not, however, confined to glass compositions although the latter have certain advantages in relation to shaping which are characteristic to glass. Cation conductive crystalline and/or ceramic materials of unusual resistivity to molten alkali metal and exhibiting extremely low resistivities are also available for this purpose. Examples of crystalline materials are disclosed in our copending application, Serial No. 458,596, filed May 25, 1965, now abandoned, some of which are hereinafter set forth in Example 4 of this specification, and in application Serial No. 500,500, now abandoned, of Neill Weber, coinventor herein, and Matthew A. Dziechuch, filed of even date herewith.

One glass which may be used with the cells of this invention and which demonstrate an unusually high resistance to attack by molten alkali metal contains about 47 to about 58 mol percent $Na_2O$, about 0 to about 15, preferably about 3 to 12, mol percent $Al_2O_3$ and about 34 to 50 mol percent $SiO_2$.

Another glass which may be used with cells of this invention and which demonstrates high resistance to attack by molten alkali metal contains about 35 to about 65, preferably about 47 to about 58, mol percent $Na_2O$, about 0 to about 30, preferably about 20 to about 30, mol percent $Al_2O_3$, and about 20 to about 50, preferably about 20 to about 30, mol percent $B_2O_3$.

The glasses described in the two preceding paragraphs can be prepared by conventional glass making procedure using the ingredients named in the stated concentrations and firing the same at temperatures of about 2700° F. These glasses are also particularly suited for use as conducting membranes in thermally regenerated metalamalgam cells. Such cells are described by J. D. Mangus and H. R. Karas in Second Quarterly Technical Progress Report on Research and Development of an Advanced Laboratory Liquid Metal Regenerative Fuel Cell for the Period May 19–August 31, 1963. Allison EDR3547, September 9, 1963, prepared under Air Force Contract AF33 (657)–11032, Task No. 817303, Project No. 8173.

In the instant use the aforementioned glasses which are resistive to attack by molten alkali metal may be used in combination with the aforementioned crystalline separators if it be desired to interpose a non-glass material between the separator and the cathodic reactant.

The anodic reactant, and in most embodiments, the cathodic reactant should be maintained in an oxygen-free atmosphere. An inert gas such as helium, argon, or nitrogen may be advantageously used in the respective containers for this purpose.

Although the anodic reactant and the cathodic reactant may be electrically connected by only the wire leads of an external circuit, in a preferred embodiment the cathodic reactant is positioned in contact with a non-sacrificial cathode of significantly greater surface area. This electrode should be a good conductor and made up of material capable of withstanding continued contact with the molten cathodic reactant. Conventional carbon electrodes which ordinarily comprise a mixture of graphite and amorphous carbon are suitable. Such electrodes are conventionally prepared by mixing fine particles of graphite, coke, etc., with a suitable binder such as pitch and subjecting the mixture to high temperatures and pressures for an extended period of time. Electrodes consisting essentially of graphite have also been found to be effective in these cells.

The cell is operated at temperatures above the melting point of both the anodic reactant and the cathodic reactant and below the temperature at which significant softening of the separator occurs when the latter is a glass. Crystalline separators are adapted to withstand even higher temperatures. Such cells will ordinarily be operated at temperatures between about 200° C. and about 600° C., more commonly in the range of about 250° C. to about 450° C. The temperature of the reactants can be maintained by external heating means as aforementioned and advantage may be taken of internal resistance within the cell for heating.

The discharge half-cycle can be terminated automatically by positioning the lead to the molten anode so that electrical connection is automatically broken when a predetermined amount of anodic material has been reacted thus lowering the upper level of unreacted anode. Changes in the melting point or electrical resistance of the cathodic reactant can also be used to indicate a desired level of discharge along with other more conventional means.

In conformity with the usual nomenclature, the terms "anode" and "cathode" as used in the present specification and claims refer to the electrodes at which the electrochemical reaction occurring within the cell develops negative and positive potentials, respectively.

Figure 1:
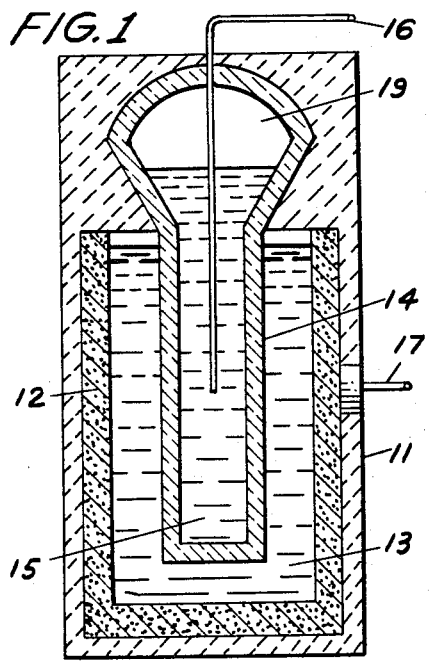
FIGURE 1 is a schematic, cross-sectional view of a simple cell in accordance with this invention providing an anodic unit comprising a cation-conductive tube containing a molten anodic reactant and substantially surrounded by a molten cathodic reactant.

Referring now to FIGURE 1, there is shown a cell container 11 which may be any suitable material or materials providing both heat and electric insulation, e.g. refractory materials, certain heat and chemical resistant polymers, ceramics, crystalline materials, or a suitable glass, etc. Inside container 11 is positioned a graphite cylinder 12 closed at the bottom end. Cylinder 12 forms a container for the cathodic reactant 13, or metal comprising oxidant, e.g. $Na_2S_5$, and a cation conductive separator 14 which also serves as a container for the anodic reactant 15, e.g. molten sodium. Separator and container 14 in this embodiment is flared near its upper end to provide excess space for the molten anodic reactant. This serves to prevent the upper level of the molten sodium from dropping below the upper level of the cathodic reactant during the discharge operation. Wire leads 16 and 17 provide means for closing the circuit and are connected to initiate reaction in the cell. Above the molten anodic reactant 15 in separator or container 14 is an inert gas 19, e.g. argon.

Figure 2:
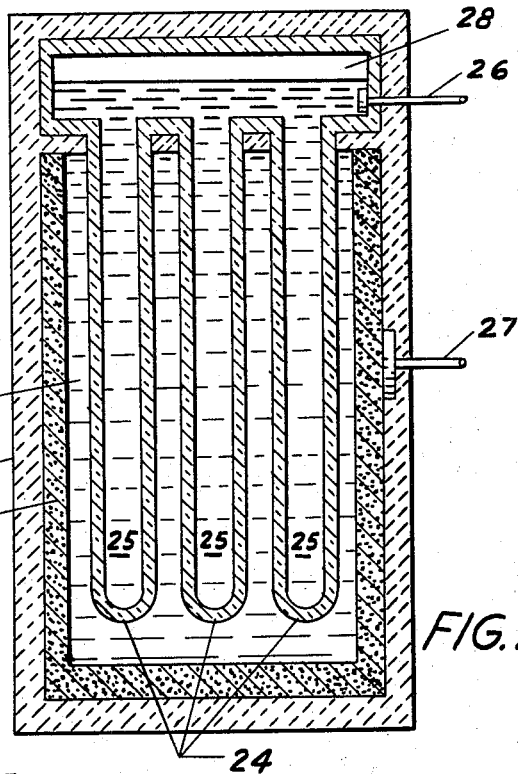
FIGURE 2 is a schematic view of a more complex cell design in accordance with this invention which includes a multi-tube anodic unit supplied by a common reservoir.

In FIGURE 2, there is shown a modification of the cell shown in FIGURE 1. In this embodiment a plurality of glass tubes 24, closed at one end and having relatively straight sides contain a molten anodic reactant 25 which may be the same or different from that shown in FIGURE 1. Each of the tubes 24 is a soda-alumina-silicia glass containing about 47 to about 58 mol percent $Na_2O$, about 3 to about 12 mol percent $Al_2O_3$ and about 34 to about 50 mol percent $SiO_2$ or a boron oxide glass containing about 47 to about 58 mol percent $Na_2O$, about 20 to about 30 mol percent $Al_2O_3$ and about 20 to about 30 mol percent $B_2O_3$. Each of the tubes 24 is fed from a common reservoir 28 which is partially filled with molten anodic reactant 25, i.e. an alkali metal which may be the same as that used in the embodiment shown in FIGURE 1 or different, e.g. potassium. Reservoir 28 may be lined with the same glass as that used in tubes 24 but other suitable materials can be used. A conductor 22 forms a container for the cathodic reactant 23. Both 22 and 23 may be the same materials as the corresponding components of the cell shown in FIGURE 1 or they may be different, e.g. aluminum for the container and a mixture of potassium and sulfur for the cathodic reactant. Insulator 21 forms a container for the entire cell. Leads 26 and 27 provide means for connecting the cell with an external circuit and closing the circuit.

In FIGURE 3 there is shown a top view of a cell wherein the glass separator or anode containers 34 are of varying size and configuration and are assembled within the cell in staggered relationship. The tubes 34 again contain a molten alkali metal 35 and are separated from the carbon cathode 32, which also serves as a cell container, for a metal salt cathodic reactant 33. Electrical connections are not shown in this view and container 32 is left uncovered for contact connection with other cells so as to form a multi-cell battery.

In FIGURE 4, an embodiment of the cell is shown which differs from the foregoing cells in that the anodic reactant 45 is not substantially enclosed by the separator 44. In this embodiment a box-like anode compartment is formed by the cell container 41 and the separator 44. The glass container 41 may be insulated from separator 44 if the glass employed in 41 is sufficiently conductive at the operating temperatures to short circuit the cell. The glass container 41 is here protected by a metal jacket 48. A cathode compartment likewise formed by the cell container 41 and the separator 44 contains the molten cathodic reactant 43 and the carbon cathode 42. Leads 46 and 47 serve the same function as the counterparts in the preceding cells. Thus, in this cell the anodic and cathodic reactants confront each other from opposite sides of a glass extending essentially in a single plane. Although losing much of the volume efficiency of the other designs, this embodiment finds use where the life of the discharge operation is more important than the amount of power delivered per unit weight per unit time.

It will be seen that in view of the flexibility of design possible with the anodic unit, i.e. the molten anodic reactant and its immediate container, the foregoing provide only a few crude embodiments out of a practically unlimited number of possible cell designs within the scope of this invention.

While in the course of normal operation both the glass separator and the cathodic reactant provide ionic conductance, a normal function of an electrolyte, this invention is not limited by any theory as to which of various functions of each is the paramount function and hence the composition of each is described in addition to the operative functions of the component.

The invention will be further understood from the following specific examples in which the details disclosed are given by way of illustration and should not be considered as limitations upon the scope of the invention.

EXAMPLE 1

A cell was constructed in accordance with this invention which included a glass tube containing sodium and a graphite rod spaced apart and immersed in $Na_2S_5$. An external circuit provided electrical connection between the sodium and the graphite. The external circuit included a voltmeter, an ammeter, and a variable resistance. The cell was placed inside an electrically heated furnace in an argon atmosphere to a temperautre above the melting point of both the sodium and the $Na_2S_5$.

The glass for the tube containing the sodium anode was prepared by mixing chemical equivalents of $SiO_2$, $Al_2O_3$, and $Na_2CO_3$ in a 4:1:1 ratio and heating the resulting mixture in a platinum crucible at 1650° C. The glass tube employed was closed at one end and had an average outside diameter of about 2 millimeters. The average wall thickness of this tube was about 0.1 millimeter or 100 microns. The $Na_2S_5$ was prepared by heating $Na_2S \cdot 9H_2O$ until essentially anhydrous. Hydrogen sulfide was bubbled through this sodium sulfide forming NaHS. This was weighed and sulfur was added in an amount necessary to convert this to $Na_2S_5$. The mixture was heated in nitrogen to drive off hydrogen sulfide and leave $Na_2S_5$. The depth of immersion into the molten $Na_2S_2$ was about 6 centimeters. This was also the confrontation distance or operational length of the tube since the tube was filled with sodium to a level above the upper level of the $Na_2S_5$ in which it was immersed. The anode containing tube was positioned about 1–2 centimeters from the graphite cathode element. The graphite rod had an average diameter of 0.25 inch and was immersed in the $Na_2S_5$ for a distance of 6 centimeters.

Since only a single anode tube and a graphite bar were used, the effective utilization of space illustrated in the drawings was not achieved. This results in the use of a greater amount of $Na_2S_5$ than would be used in the more efficient cell designs shown in the drawings and increases internal resistance. A tungsten wire immersed in the sodium and a platinum wire connected to the graphite were connected by a copper wire to complete the external circuit. The wires used were 24 gauge.

The cell was connected by an automatic switch to a source of charging current in a manner such that the cell was continuously alternately charged then discharged for a period of about 48 hours, without significant change in voltage current deliverability. The appearance of the cell components was unchanged at the end of this period. The time interval for each discharge period was 10 minutes. The charging period was the same.

Cell performance was checked at varying temperatures above the melting points of the reactants. The following data are illustrative. At temperatures of 310°, 340°, and 387° C, the open circuit potential was essentially the same, i.e. 2–2.1 volts. When the anode and cathode leads were directly connected with only the resistance of the wires and a low resistance ammeter intervening, the current varied sharply with temperature, e.g. 310° C.—175 milliamperes, 340° C.—240 milliamperes, and 387° C.—430 milliamperes.

When current was passed through the cell during both charging and discharging operations, the cell potential differed from theoretical in an amount essentially equal to the calculated drop from ohmic resistance signifying the absence of significant polarization at either electrode. The measured ohmic drop across the glass membrane at 300° C. was 0.2 volts when the current density through the glass was 5.0 milliamperes per square centimeter.

Tests were made using a platinum cathode in lieu of the graphite bar. The results obtained were essentially the same.

EXAMPLE 2

Soda-alumina-silica glass separators with the following concentrations of components were tested for attack by molten sodium and for electrical resistivity.

| Glass Number | Mol percent | | | Log of Resistivity (ohm-cm.) | | |
|---|---|---|---|---|---|---|
| | $Na_2O$ | $Al_2O_3$ | $SiO_2$ | 200° C. | 300° C. | 400° C. |
| 31 | 49.8 | 7.5 | 42.7 | 3.47 | 2.42 | 1.75 |
| 33 | 49.5 | 10.25 | 40.25 | 3.57 | 2.60 | 1.87 |
| 37 | 49.0 | 4.0 | 47.0 | 3.35 | 2.44 | 1.77 |

When heated in contact with liquid sodium at 350° C., the above glasses gained less than 0.1 milligram/cm.$^2$/1000 hours and showed none of the characteristic brown colorations, flaking or other evidence of sodium attack.

EXAMPLE 3

The following glasses containing $B_2O_3$ were tested for attack by molten sodium and for electrical resistivity within a range of temperature with the following results.

| Glass Number | Mol percent | | | Log of Resistivity (ohm-cm.) | | |
|---|---|---|---|---|---|---|
| | $Na_2O$ | $Al_2O_3$ | $B_2O_3$ | 200° C. | 250° C. | 350° C. |
| 48 | 50 | 23 | 27 | 4.65 | 4.00 | 3.00 |
| 49 | 45 | 27.5 | 27.5 | 5.00 | 4.35 | 3.32 |
| 50 | 35 | 30 | 35 | | 5.35 | 4.25 |

These glasses demonstrated no visible deterioration from attack by molten sodium at 350° C. after exposure in excess of two months.

The term "glass" as employed herein is meant to conform to the definition of such term as set forth in A.S.T.M. designation C–162–45T. See also, pp. 1–8, Physical Properties of Glass, J. E. Stanworth, Oxford University Press, London, 1950, and Glass Industry (1945) 26, 417.

EXAMPLE 4

A single cell secondary battery is constructed with the interior of a first glass tube and the interior of a second glass tube separated by a slab of sodium beta-alumina affixed thereto in liquid-tight relationship by glass seals. The tubes have an internal diameter of about 12 mm. These and the glass seals are constructed of a glass having a coefficient of expansion close to that of beta-alumina, e.g. Corning 7052, Kovar. The first tube, forming the anode compartment, is filled with molten sodium and the second tube is partially filled with molten sodium and sulfur containing reactant such as sodium pentasulfide ($Na_2S_5$). The sodium and $Na_2S_5$ are maintained in molten state by conventional heating. The air in the tubes may be essentially evacuated and the tubes sealed or the cell may be operated in an inert atmosphere, e.g. argon. The beta-alumina slab is about 12 mm. in diameter and about 2 mm. thick with a face area exposed to the reactant in each of the tubes being about 1.13 cm.$^2$, assuming a completely flat surface.

In this cell the molten sodium serves both as the anodic reactant and as an electrode while the sodium and sulfur reactant serve both as the cathodic reactant and as a liquid electrolyte. Ordinarily, one would start the reaction with the cathodic reactant having a sodium to sulfur ratio of about 2:5 and terminate the cell discharge when this ratio is at least about 2:3. A copper wire lead extends into the sodium electrode (anode) and a stainless steel electrode (cathode) extends into the sodium pentasulfide. They are electrically connected via an external circuit which may include a voltmeter, ammeter, etc. In the discharge half-cycle of this cell, the sodium is attracted to the sulfur opposite the beta-alumina membrance, the aforereferred to slab, gives up an electron, passes through the membrane as a sodium ion and combines with a sulfide ion formed at the cathode with acceptance of an electron, thus causing an electric current to flow through the aforementioned circuit. Recharging is effected by impressing an external source of electric power upon the circuit with a reverse electron flow in relation to the discharge half-cycle.

The open circuit voltage of the cell above described is about 2 volts. At a temperature of about 312° C., this cell demonstrates the following charge-discharge characteristics:

| Discharge | | Charge | |
|---|---|---|---|
| E[1] | I[2] | E[1] | I[2] |
| 2.1 | 0 | 2.1 | 0 |
| 1.75 | 10 | 2.45 | 10 |
| 1.42 | 20 | 2.77 | 20 |
| 1.1 | 30 | 3.14 | 30 |
| .84 | 40 | 3.45 | 40 |
| .38 | 60 | 4.1 | 60 |

[1] Volts.  [2] Milliamperes.

A cell as above described is subjected to life test consisting of ½ hour charge and discharge cycles at a temperature of about 312° C. In this cell, the sodium beta-alumina slab is prepared in the following manner:

Commercially available beta-alumina refractory bricks are ground and/or milled to a powder the particles of which are less than about 1, preferably not significant greater than about ⅓ micron, in maximum diameter. To the resulting powder is added $Na_2CO_3$ or $Al_2O_3$ powder of like size, if necessary to bring the concentration of $Na_2O$ to about 5 to 6 wt. percent of the mixture, and hence to provide near stoichiometric composition for $Na_2O$. 11 $Al_2O_3$. The powder is pressed into pellets at about 9000 p.s.i., e.g. pellets of about ¾ inch diameter, ½-inch length and a green density of about 1.98 gm./cm.$^3$. Sintering of the pellets is carried out in an enclosed platinum-rhodium crucible, in the presence of a coarse powder of beta-alumina, i.e. particles of above 1 micron diameter, at a temperature in the range of about 2900° to about 3300° F. for a time in the range of about 5 minutes to about 1 hour. The sintered pellet has a density of about 3.0 gm./cm.$^3$ and is sliced into thin slabs and used as solid electrolytes in the cells hereinbefore described.

A cell of the type used in the previous tests is tested at 294° C. to determine its charge-discharge characteristics. In this cell the beta-alumina slab electrolyte is prepared in the following manner:

Powders of $Na_2CO_3$ and $Al_2O_3$ are mixed in such proportion as to provide a mixture equivalent to 60 wt. percent $NaAlO_2$ and 40 wt. percent $Na_2O_3$. This mixture is heated to about 2900° F. and forms a molten eutectic which when cooled to room temperature yields a product made up of particles of sodium beta-alumina imbedded in $NaAlO_2$. The $NaAlO_2$ is dissolved in water leaving the powdered sodium beta-alumina which is then ground and/or milled.

The particle size prior to sintering is about 0.16 micron. The green pellets are sintered at 3250° F. for 5 minutes in a closed container in the presence of a coarse powder of sodium beta-alumina. The slab used in this cell is about 2.8 mm. in thickness and presents a 1.5 cm.$^2$ face to each reactant. The $Na_2O$ content of the finished slab is about 5.75 wt. percent (about 9.1 mole percent). The $SiO_2$ content is about 0.05 wt. percent. The charge-discharge characteristics of this cell are observed as follows:

| Discharge | | Charge | |
|---|---|---|---|
| $E^1$ | $I^2$ | $E^1$ | $I^2$ |
| 1.95 | 0 | 1.95 | 0 |
| 1.80 | 20 | 2.06 | 10 |
| 1.62 | 40 | 2.40 | 50 |
| 1.13 | 100 | 2.61 | 75 |
| 0.03 | 200 | | |

[1] Volts.  [2] Milliamperes.

Sodium beta-alumina slabs are prepared from the eutectic as hereinbefore described. The beta-alumina powder prior to sintering has an average particle size of about 0.16 micron. Sintering is carried out at about 3285° F. for about ½ hour. The resulting pellet has a density of about 3.05 gm./cm.$^3$ and contains about 5.75 wt. percent (about 9.1 mole percent) $Na_2O$ and about 0.05 wt. percent $SiO_2$, with a remainder essentially all $Al_2O_3$.

Beta-alumina electrolytes prepared in this manner are tested to ascertain the electrical resistance of the slabs at various temperatures and the following results are observed:

| Temperature: | Resistivity (ohm-cm.) |
|---|---|
| 25 | 750 |
| 100 | 168 |
| 150 | 88.0 |
| 200 | 52.0 |
| 300 | 27.5 |
| 400 | 18.5 |

It will be obvious to those skilled in the art that modifications may be made of the cells illustrated in the drawings and in the details of the foregoing examples without departing from the scope of the invention as set forth in the appended claims.

We claim:

1. A method for generating electrical energy electrochemically which comprises maintaining
   (1) an alkali metal anode-reactant and
   (2) a cathodic reactant-electrolyte that is
      (a) electrochemically reversibly reactive with cations of said alkali metal and
      (b) in contact with a cathode
on opposite sides of and in contact with a solid, half-cell separator that separates said anode-reactant and the anodic half-cell reactions thereof from said cathodic reactant-electrolyte and the cathodic half-cell reactions thereof, said separator comprising a solid electrolyte that is selectively-ionically-conductive with respect to cations of said alkali metal when a difference of electrical potential is provided between said anode-reactant and said cathode, electrically connecting said anode-reactant and said cathode with a conductor which forms a portion of an electrical circuit and provides means for electron flow between said anode-reactant and said cathode, said electrical circuit being completed by ionic conduction between said anode-reactant and said cathode through said cathodic reactant-electrolyte and said solid electrolyte, and maintaining said anode-reactant and said cathodic reactant-electrolyte at a temperature sufficient to maintain both in molten state and effect said half-cell reactions.

2. The method of claim 1 wherein said anode-reactant and said cathodic reactant are maintained at a temperature in the range of about 200° C. to about 600° C.

3. The method of claim 1 wherein said alkali metal is sodium.

4. The method of claim 1 wherein said cathodic reactant-electrolyte comprises a molten sulfide of said alkali metal.

5. The method of claim 1 wherein said alkali metal is sodium and said cathodic reactant-electrolyte is a sulfur and sodium ion comprising oxidant wherein the ratio of sulfur to sodium is greater than that of $Na_2S_3$.

6. A method for generating electrical energy electrochemically which comprises maintaining
   (1) an alkali metal anode-reactant and
   (2) a cathodic reactant-electrolyte that is
      (a) electrochemically reversibly reactive with cations of said alkali and
      (b) in contact with a cathode
on opposite sides of and in contact with a solid, half-cell separator that separates said anode-reactant and the anodic half-cell reactions thereof from said cathodic reactant-electrolyte and the cathodic half-cell reactions thereof, said separator comprising a solid electrolyte that is selectively-ionically-conductive with respect to cations of said alkali metal when a difference of electrical potential is provided between said anode-reactant and said cathode and is further characterized by an electrical resistivity at 350° C. of not substantially in excess of 1,000 ohm-cm., electrically connecting said anode-reactant and said cathode with a conductor which forms a portion of an electrical circuit and provides means for electron flow between said anode-reactant and said cathode, said electrical circuit being completed by ionic conduction between said anode-reactant and said cathode through said cathodic reactant-electrolyte and said solid electrolyte, and maintaining said anode-reactant and said cathodic reactant electrolyte at a temperature sufficient to maintain both in molten state and effect said half-cell reactions.

7. The method of claim 6 wherein said alkali metal and said cathodic reactant-electrolyte are maintained at a temperature in the range of about 250° C. to about 450° C.

8. The method of claim 6 wherein said cathodic reactant-electrolyte comprises sulfur and ions of sulfur and sodium.

9. The method of claim 6 wherein said alkali metal is sodium.

10. A method for generating electrical energy electrochemically which comprises maintaining
    (1) a sodium metal anode-reactant and
    (2) a cathodic reactant-electrolyte that is
       (a) electrochemically reversibly reactive with cations of sodium and
       (b) in contact with a cathode
on opposite sides of and in contact with a solid, half-cell separator that separates said anode-reactant and the anodic half-cell reactions thereof from said cathodic reactant-electrolyte and the cathodic half-cell reactions thereof, said separator comprising a solid electrolyte that is selectively-ionically-conductive with respect to cations of sodium when a difference of electrical potential is provided between said anode-reactant and said cathode, electrically connecting said anode-reactant and said cathode with a conductor which forms a portion of an electrical circuit and provides means for electron flow between said anode-reactant and said cathode, said electrical circuit being completed by ionic conduction between said anode-reactant and said cathode through said cathodic reactant-electrolyte and said solid electrolyte, and maintaining said anode-reactant and said cathodic reactant-electrolyte at a temperature sufficient to maintain both in molten state and effect said half-cell reactions.

11. The method of claim 10 wherein said solid electrolyte is a glass object consisting essentially of about 47 to about 58 mol percent $Na_2O$, about 0 to 15 mol percent $Al_2O_3$ and about 34 to about 50 mol percent $SiO_2$.

12. The method of claim 10 wherein said solid electrolyte is a glass object consisting essentially of about 47 to about 58 mol percent $Na_2O$, about 3 to about 12 mol percent $Al_2O_3$ and about 34 to about 50 mol percent $SiO_2$.

13. The method of claim 10 wherein said barrier is a glass consisting essentially of about 35 to about 65 mol percent $Na_2O$, and about 10 to about 30 mol percent $Al_2O_3$ and about 20 to about 50 mol percent $B_2O_3$.

14. The method of claim 10 wherein said solid electrolyte is a glass object consisting essentially of about 47 to about 58 mol percent $Na_2O$, about 20 to about 30 mol percent $Al_2O_3$ and about 20 to about 30 mol percent $B_2O_3$.

15. A method for generating electrical energy electrochemically which comprises maintaining
   (1) an alkali metal anode-reactant and
   (2) a cathodic reactant-electrolyte that is
      (a) electrochemically reversibly reactive with cations of said alkali metal and
      (b) in contact with a cathode on opposite sides of and in contact with a solid, half-cell separator that separates said anode-reactant and the anodic half-cell reactions thereof from said cathodic reactant-electrolyte and the cathodic half-cell reactions thereof, said separator comprising a solid electrolyte that is selectively-ionically-conductive with respect to cations of said alkali metal when a difference of electrical potential is provided between said anode-reactant and said cathode and is further characterized in having an eltcrical resistivity at 300° C. of less than 500 ohm-cm., connecting said sodium metal and said cathode with a conductor which forms a portion of an electrical circuit and provides means for electron flow between said anode-reactant and said cathode, said electrical circuit being completed by ionic conduction between said anode-reactant and said cathode through said cathodic reactant-electrolyte and said soild electrolyte, and maintaining said anode-reactant and said cathodic reactant electrolyte at a temperature sufficient to maintain both in molten state and effect said half-cell reactions.

16. The method of claim 15 wherein said alkali metal and said cathodic reactant-electrolyte are maintained at a temperature in the range of about 200° C. to about 600° C.

17. The method of claim 15 wherein said alkali metal is sodium and said cathodic reactant-electrolyte comprises sulfur and ions of sulfur and sodium.

18. A method for generating electrical energy electrochemically from molten reactants and electrochemically restoring the chemical potential of said reactant for further generation of electrical energy electrochemically which comprises maintaining
   (1) an alkali metal anode-reactant and
   (2) a cathodic reactant-electrolyte that is
      (a) electrochemically reversibly reactive with cations of said alkali metal and
      (b) in contact with a cathode on opposite sides of and in contact with a solid, half-cell separator that separates said anode-reactant and the anodic half-cell reactions thereof from said cathodic reactant-electrolyte and the cathodic half-cell reactions thereof, said separator comprising a solid electrolyte that is selectively-ionically-conductive with respect to cations of said alkali metal when a difference of electrical potential is provided between said anode-reactant and said cathode, electrically connecting said anode-reactant and said cathode with a conductor which forms a portion of an electrical circuit and provides means for electron flow between said anode-reactant and said cathode, said electrical circuit being completed by ionic conduction between said anode reactant and said cathode through said cathodic reactant-electrolyte and said solid electrolyte, maintaining said anode-reactant and said cathodic reactant-electrolyte at a temperature sufficient to maintain both in molten state and effect said half-cell reactions with resultant conduction of alkali metal cations from said anode-reactant through said solid electrolyte into said cathodic reactant-electrolyte and electron flow from said anode-reactant through said conductor to said cathode, and impressing extraneous source of electrical energy upon said electrical circuit which provides a difference of electrical potential between said anode-reactant and said cathode, reverses the polarity of said anode-reactant and said cathode, reverses the direction of flow of electrons through said conductor and reverses the direction of ionic conduction of alkali metal cations through said solid electrolyte.

19. The method of claim 18 wherein said alkali metal is sodium and said cathodic reactant-electrloyte comprises sulfur and ions of sulfur and sodium.

References Cited

UNITED STATES PATENTS 2,102,701 12/1937 Gyuris.
2,631,180 3/1953 Robinson _____ 136—83
2,829,090 4/1958 Eisenman et al.

WINSTON A. DOUGLAS, *Primary Examiner.*

A. SKAPARS, *Assistant Examiner.*